(12) United States Patent
Theis

(10) Patent No.: US 9,657,870 B1
(45) Date of Patent: May 23, 2017

(54) WIRE REINFORCED THERMOPLASTIC LAMINATED HOSE AND METHOD OF MANUFACTURING SAME

(71) Applicant: Schieffer Co. International L.C., Peosta, IA (US)

(72) Inventor: Jeffrey D. Theis, Dubuque, IA (US)

(73) Assignee: Schieffer Co. International L.C., Peosta, IA (US)

( * ) Notice: Subject to any disclaimer, the term of this patent is extended or adjusted under 35 U.S.C. 154(b) by 116 days.

(21) Appl. No.: 14/044,053

(22) Filed: Oct. 2, 2013

Related U.S. Application Data

(60) Provisional application No. 61/708,868, filed on Oct. 2, 2012.

(51) Int. Cl.
*F16L 11/08* (2006.01)

(52) U.S. Cl.
CPC .................................. *F16L 11/087* (2013.01)

(58) Field of Classification Search
CPC ..................................................... F16L 11/087
USPC ........................................ 138/125, 127, 141
See application file for complete search history.

(56) References Cited

U.S. PATENT DOCUMENTS

| | | | | |
|---|---|---|---|---|
| 3,776,794 A | * | 12/1973 | Ingham | B29C 47/023 156/143 |
| 3,791,898 A | * | 2/1974 | Remi | E21B 17/20 138/130 |
| 3,944,453 A | * | 3/1976 | Chudgar | B29C 53/587 138/125 |
| 4,341,578 A | | 7/1982 | Chermak | |
| 4,380,252 A | * | 4/1983 | Gray et al. | 138/125 |
| 4,447,378 A | * | 5/1984 | Gray et al. | 264/45.9 |
| 4,584,431 A | * | 4/1986 | Tippie et al. | 174/107 |
| 4,952,262 A | | 8/1990 | Washkewicz | |
| 5,170,011 A | * | 12/1992 | Martucci | 174/47 |
| 5,698,278 A | * | 12/1997 | Emond | F16L 11/085 138/127 |
| 7,222,644 B2 | | 5/2007 | Pianetto et al. | |
| 8,056,584 B2 | * | 11/2011 | Burrowes | C08L 23/0815 138/125 |
| 2011/0048566 A1 | | 3/2011 | Theis | |

* cited by examiner

*Primary Examiner* — Vishal Pancholi
(74) *Attorney, Agent, or Firm* — Shuttleworth & Ingersoll, PLC; James C. Nemmers

(57) ABSTRACT

A high pressure hose has an inner tube comprised of a thermoplastic material that defines a fluid carrying passageway. A reinforcing layer is formed by a plurality of steel wires helically wound in opposite directions over the inner tube along its longitudinal axis. An outer layer of thermoplastic material extends over the reinforcing layer and fills the voids in and under the wires of the reinforcing layer so that the thermoplastic outer layer permanently fills the voids in the wires of the reinforcing layer and is fused to the outer surface of the inner tube.

12 Claims, 6 Drawing Sheets

WIRE REINFORCED THERMOPLASTIC LAMINATED HOSE AND METHOD OF MANUFACTURING SAME

This application claims priority under 35 USC 119 to Provisional Patent Application Ser. No. 61/708,868 filed on Oct. 2, 2012, the contents of which are hereby incorporated by reference.

FIELD OF THE INVENTION

The invention is related to wire reinforced thermoplastic high performance, high pressure hose suitable for hydraulic actuation, high pressure spray, such as water cleaning, and transfer of a medium under high pressure.

BACKGROUND OF THE INVENTION

Wire and thermoplastic high pressure hoses are ubiquitous. So much so that the Society of Automotive Engineers (SAE) has adopted detailed standards that describe the materials used in their construction, dimensional tolerances and the dynamic test parameters for a wide range of rubber and thermoplastic high pressure hoses. One such standard is SAE J517:2008 with the subheadings of SAE100R1, SAE100R2, SAE100R16 and SAE100R17.

The processes for manufacturing high performance wire reinforced rubber hoses were generally devised in the first half of the last century. This was an era where energy, space and labor were cheap and environmental awareness was simply not a major consideration of process design. Certainly, advances have been made, but the basic process remains more or less the same.

The traditional method of manufacturing high performance, high pressure, steel wire braided rubber hose is well known: As a first step, a semi-flexible polymeric solid continuous mandrel is extruded. As a second step, a rubber tube is extruded over said mandrel. As a third step, wire reinforcement in the form of a plurality of high tensile strength steel wire is applied over the outer surface in the form of a braided or spirally wound structure. As a fourth step, a rubber cover is extruded over the outside of the wire structure. As a fifth step, the wire structure is encapsulated in a textile tape or a semi-rigid thermoplastic sheath. As a sixth step, the sheathed structure is cured using some form of heating apparatus. Generally speaking this process is carried out by placing the uncured hose structure into a steam autoclave for a specified period of time so as to accomplish curing or vulcanization of the structure. As a seventh step, the formerly applied textile tape or semi-rigid thermoplastic sheath is removed. As an eight step, the mandrel is removed from the inner tube and for all intents and purposes, the hose is finished.

There have been attempts over the years to reduce the number of steps described above that have resulted in some reduction or combining of the eight basic steps noted. Most of those methods have been driven with cost savings as their main thrust. However, generally speaking, the mandrel manufacture and use, the curing process, the mandrel removal are all necessary components to manufacturing a wire reinforced rubber high pressure hose suitable for the purposes desired and are widely in use today.

The use of thermoplastic in hose design has been one means of reducing the complicated steps associated with a cured rubber hose. Such a process can be reduced in its most basic form to three steps. The first step is to extrude a thermoplastic tube. As a second step, the tube is reinforced with braiding of yarn or steel. The third step is to apply a cover material.

Hoses that are reinforced with yarn are also well known in the field. Within the SAE J517 standard, there is an applicable subheading for such products known as SAE100R7. Because such hoses do not incorporate wire as the pressure support, they are prone to kinking, can be cut through if impacted by something sharp and are generally known to be quite stiff.

To date, there is no subheading within J517 for a wire braided thermoplastic high pressure hose. While the basic steps for manufacturing a wire braided thermoplastic hose have been reduced from eight to three, the prior art processes add too much complexity and risk to the three steps. This is because historically, such hoses have been made using complicated and expensive manufacturing techniques and are comprised of expensive engineered thermoplastic materials. In spite of such complexity and risk, the prior art processes do not produce improved hoses, especially in the area of pinhole prevention and lamination of the various layers. Additionally, the resulting hoses of such methods are relatively stiff due to the use of mostly semi-rigid thermoplastic materials.

Two such examples of prior art are Chermak U.S. Pat. No. 4,341,578 and Washkewicz U.S. Pat. No. 4,952,262. Both patents describe a method of extruding a thermoplastic tube, applying braided steel wire reinforcement and extruding a cover over the reinforcement. Both patents advocate a method of heating the outside of the wire braid through an extra induction heating method and both advocate the pressurization of the inner tube with compressed air as a means of intentionally protruding the outer surface of the inner tube into contact with the small interstices between the wire braid layers.

FIG. 1 illustrates the structure of the hose of the Chermak U.S. Pat. No. 4,341,578 and demonstrates the result graphically, depicting protrusion 10 of the inner tube 12 through the interstices of the braid layer 14 and on through to the outside of the braid layer and into the outer tube 16. Chermak runs an unacceptably high risk of pin holes caused by protrusion 10 from within the inner tube 12. This is due to the high amount of heat applied throughout the structure and the pressure from within the tube being applied during the process FIG. 2 illustrates the structure of the hose of the "Washkewicz" U.S. Pat. No. 4,952,262 and depicts the protrusion 20 from both sides 22 and 26 of the braid layer 24. This results from the inner tube 22 being forced under pressure while the outer cover 26 is extruded through the conductively heated wire braid structure 24 to protrude through the interior of the braid layer 24. As taught by Washkiewicz, such protrusion 20 of the outside of the inner tube 22 is risky and prone to producing so called pin hole leaks as the pressure from the inside of the tube combined with the heated wire 24 and the pressure and temperature of the extruder head and the melted extrudate are very difficult to control.

Washkiewicz attempts to mitigate the limitations of Chermak, but still produces an unacceptably high risk of pinholes caused by protrusion from the outside through the heated wire and inner tube. This is due to the methods applied by Chermak and Washkiewicz which can result in an imbalance between competing thermal and pressure zones.

FIG. 3 is another example of prior art showing the hose of Pianetto U.S. Pat. No. 7,222,644. The disadvantages of this hose concept are numerous. Pianetto advocates the use of highly flexible inner tube materials and a method that does not thermally bond the layers together. Such bonding of the layers is desirable in high performance hoses such as those described in SAEJ517. In Pianetto, the outside thermoplastic layer 36 does not come into contact with the inside thermoplastic layer 32 leaving voids 30 in the braid layer 34. Pianetto teaches that optionally, a layer of adhesive can be applied to bond and fill the voids between the layers. The disadvantages of Pianetto are evident by the relative low performance of the hose of no more than 30,000 impulses at only 25% of the minimum burst rating of up to 16,000 PSI simultaneously with fluid at a maximum temperature of 140° Fahrenheit. By comparison an SAEJ517, SAE100R16, compliant product whereby a nominal ⅜" diameter hose has to meet a minimum of 200,000 impulses 33% of the minimum burst rating of 16,000 PSI at 212° Fahrenheit. The methods for measuring burst pressure, impulse, temperature, etc. are well known to those familiar in the art and described in detail with the SAE J517 document.

Further, Pianetto discloses conventional hoses braided to an angle of 1.4 or less, yet teaches a braid angle of at least about 1.4 or more. To those familiar with the art, the definition is universally defined as "pitch". Pitch is defined at the length in inches that it takes for the helically wound plurality of wire strips to make a full revolution around the circumference of the hose tube. It is well known to those familiar with the art that such a long pitch would result in a hose that will likely change in length when impulse tested. Excessive change in length is a major factor contributing to low impulse performance.

Lastly, Pianetto teaches the use of an adhesive using a known hazardous material, Methyl Ethyl Ketone (MEK) as part of a process to impart adhesion. MEK is considered extremely flammable and prolonged exposure to MEK is well documented as being a hazard to humans and the environment.

Moreover, high pressure wire reinforced hoses have been used for decades in the field of high pressure water cleaning. As an environmental tool, water cleaning under high pressure actually uses less water than cleaning with water at low pressure. Further, high pressure agitation can accomplish many cleaning tasks without the use of chemicals. Thus, it stands to reason that environmentally sound practices should be considered when supporting the cleaning process.

As stated, the known prior art for manufacturing wire reinforced thermoplastic hose are known to be very complex, dangerous, and energy inefficient as often they use materials and processes that are poisonous to humans and the environment.

Therefore, there exists a need for an inexpensive, high performance wire braided thermoplastic hose that meets and goes beyond the minimum characteristics of traditional rubber hose. The present invention is an economical, energy and materially efficient, safe and environmentally sound method of manufacturing a high performance hose suitable for hydraulic actuation, high pressure spraying and transfer of various liquid media under high pressure.

OBJECTS OF THE INVENTION

Thus, one object of the present invention is a hose manufacturing process that conserves material, energy and that is more environmentally friendly than rubber hose. The hose of the present invention is a demonstrably novel and environmentally friendly product by comparison to those defined in the known prior art.

Additionally, as the present invention results in a hose that has a considerably longer life than some of the known prior art hoses, replacement will naturally be at less frequent intervals. Said longer life results in a reduced frequency of failure and a correspondingly lesser risk of undesired leaking of a liquid medium, especially where the medium is a material such as paint or hydraulic fluid which can be damaging to the environment.

Thermoplastic high pressure hoses are generally covered with a high gloss polyurethane thermoplastic material. Softer grades of polyurethane exhibit considerable tackiness when extruded with a high gloss, the finish causing the hose to have a tendency to stick to itself when the hose is handled. The result is undesirable for a hose that comes into contact with itself during installation and handling.

One object of the present invention is to produce a polyurethane hose that is easier to handle by applying a matte surface finish that is textured in such a way as to reduce the coefficient of friction. The resulting non-glossy hose slides against surfaces and against itself much easier than known finishes.

An additional object of the present invention is to demonstrate a novel hose manufacturing method for wire braided hose that uses a fast, simple, economical, ecologically and energy efficient process using thermoplastics instead of thermosetting rubber, while accomplishing the same dynamic performance requirements as specified within the SAE Standard SAEJ517 under the subheadings of SAE100R1, SAE100R2, SAE100R17 and SAE100R16.

Another object of the present invention is to demonstrate a novel simplified method of chemically and thermally bonding the thermoplastic and reinforcing hose layers into one structure by using a fast, simple and economical process that is also ecologically and energy efficient whereby the resulting hose has the same performance as specified within the SAE Standard SAEJ517 under the subheadings of SAE100R1, SAE100R2, SAE100R17 and SAE100R16.

Yet, another object of the present invention is to produce a hose that exhibits superior traits over conventionally manufactured and presently known wire braided thermoplastic hoses.

SUMMARY OF THE INVENTION

The method for making the hose of the invention has a first step whereby a thermoplastic tube is extruded using conventional thermoplastic methods. As a second and separate step, the tube is reinforced with a layer of a plurality of steel wires wound helically in opposite directions and intersecting to form a braided reinforcing structure. As a third step, the braided structure is passed through an extrusion head where thermoplastic material, that is the same or similar melted thermoplastic material to the material of the first step, is pressure injected through the minute braid interstices of the braided wires and through them to fill the gaps underneath, throughout and underneath the wires. The melted thermoplastic thermally fuses with the common material on the outside of the inner tube to form the completed hose.

DESCRIPTION OF THE PREFERRED EMBODIMENTS OF THE INVENTION

Incorporated by reference to this application is my United States patent application Publication No. 2011/0048566 A1. Said application references prior art and limitations, some of which are applicable to this application.

For purposes of the present invention, the term "thermoplastic" means any combination of materials that do not require vulcanization or curing as a step. This would include Thermoplastic Elastomers (TPV), Thermoplastic Vulcanizates (TPV) and all materials that may be substantially rubber but process as a thermoplastic, that is to say, they can become liquid at an elevated temperature and revert to a solid at a lower temperature. Thermoplastic by the preceding definition is as opposed to thermoset elastomers whereby a soft or liquid compound is vulcanized by heat and after such vulcanization will not revert to a liquid state at elevated temperature.

Figure 1:
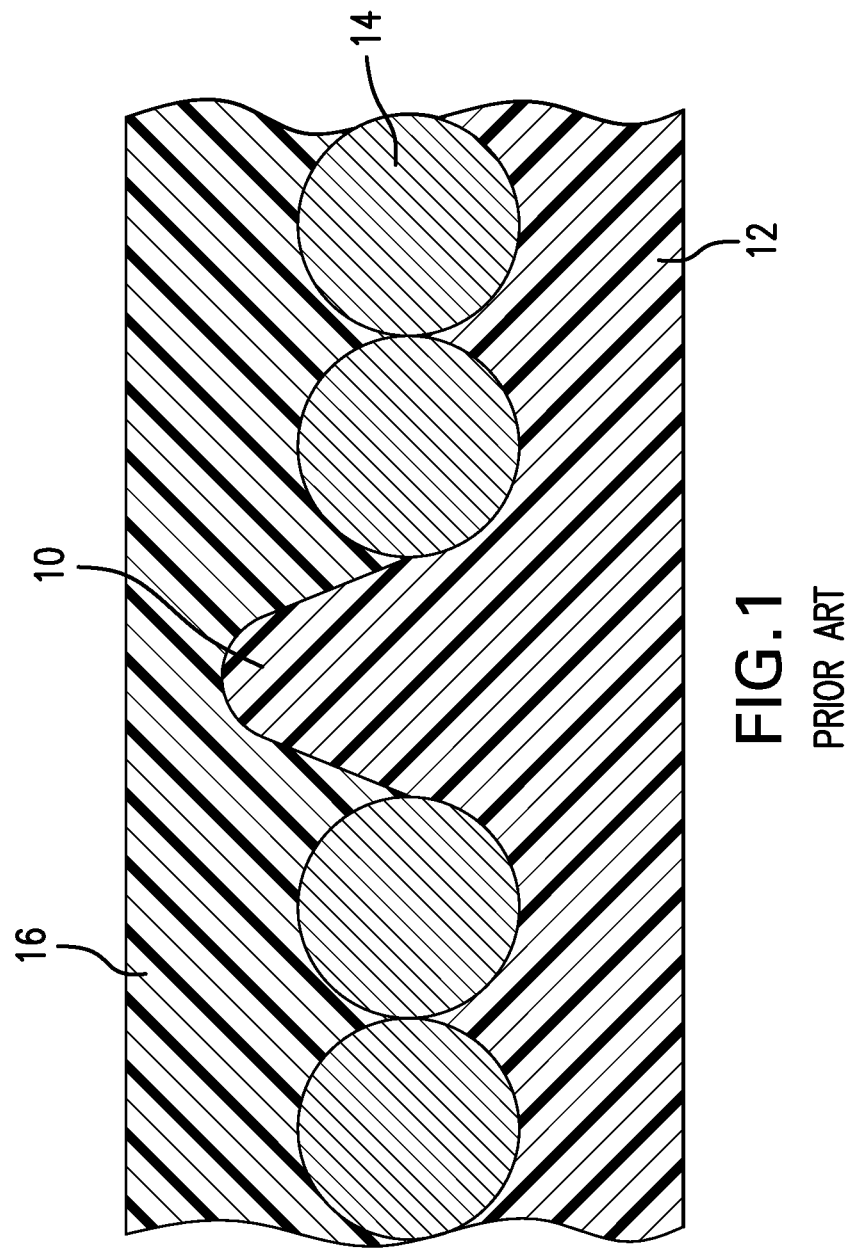
FIG. 1 is a longitudinal section view through the walls of a prior art hose.
Figure 2:
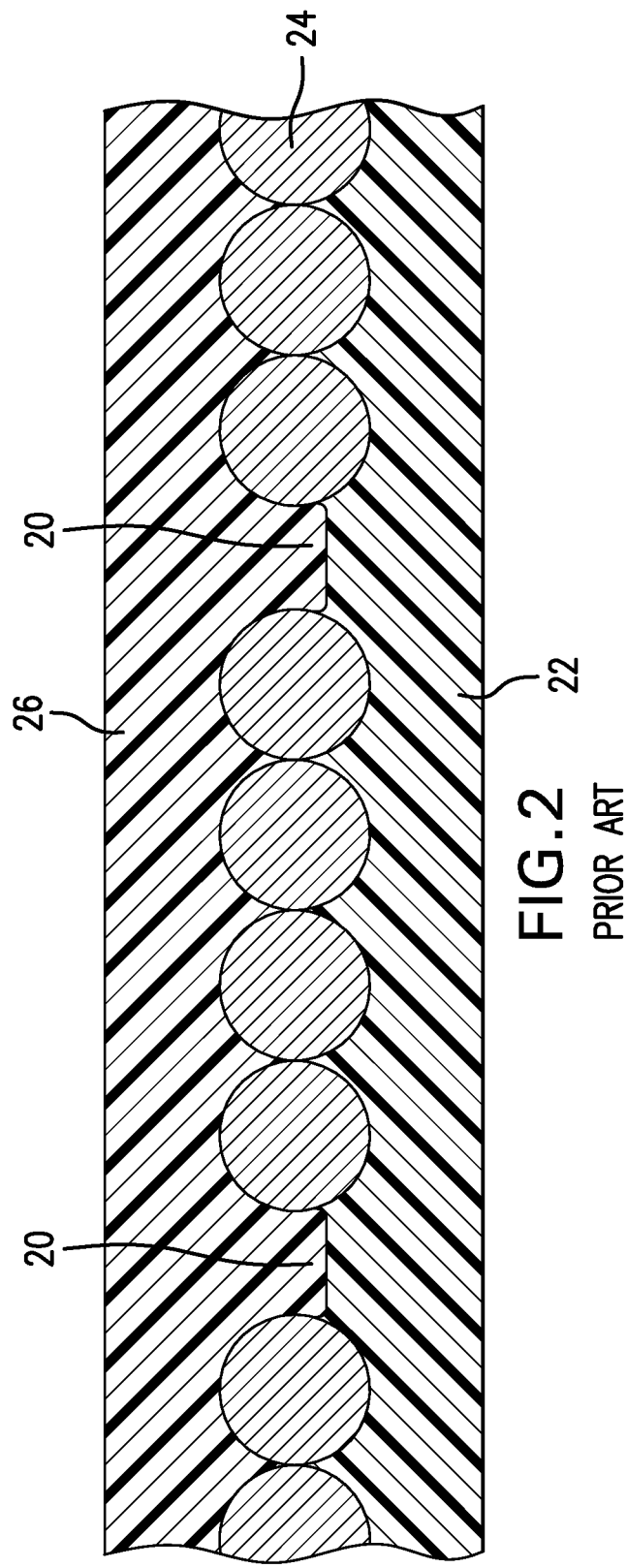
FIG. 2 is a longitudinal sectional view through the walls of another prior art hose.
Figure 3:
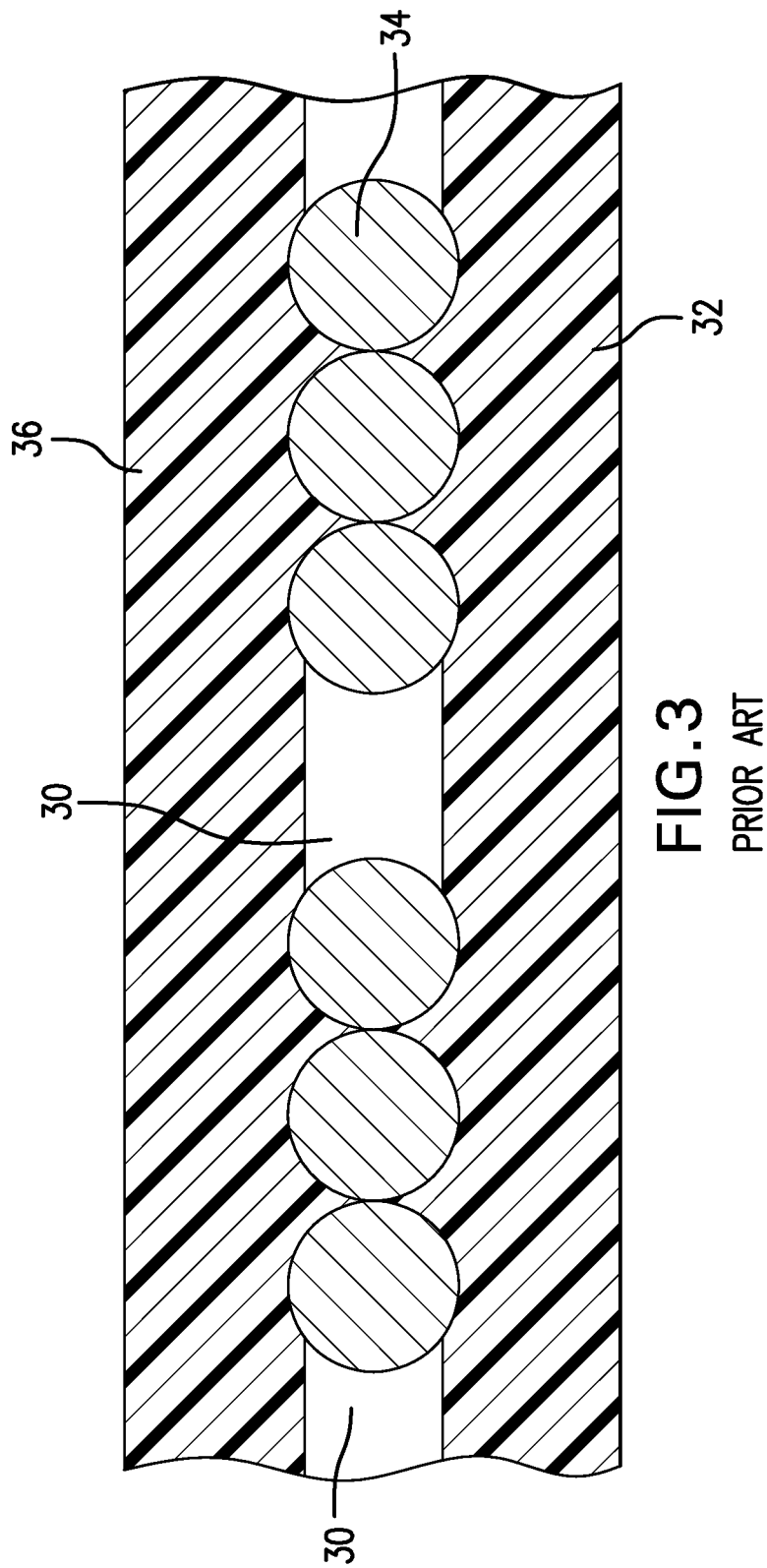
FIG. 3 is a longitudinal sectional view through the walls of yet another prior art hose.
Figure 4:
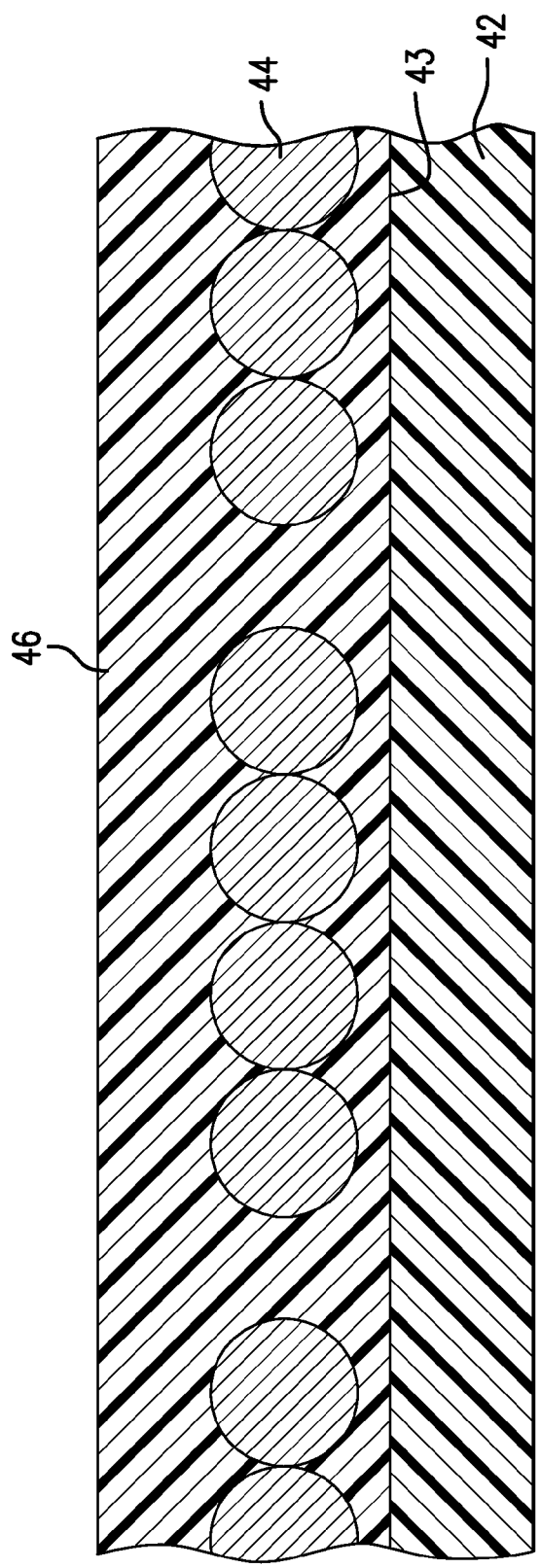
FIG. 4 is a longitudinal sectional view through the walls of a hose constructed according to the principles of the invention.

As illustrated in FIG. 4 which shows a sectional view of the walls of a hose constructed according to the principles of the present invention, the illustrated hose is produces with a first step whereby a thermoplastic inner tube 42 having an outer surface 43 is extruded using conventional thermoplastic methods. As a second and separate step, the inner tube 42 is reinforced with a layer of a plurality of steel wires wound helically in opposite directions around and over the outer surface of the inner tube 42, the wires intersecting to form a braided structure that comprises a reinforcing layer 44. As a third step, the partially formed hose is passed through an extrusion head where the same or similar melted thermoplastic that forms the inner tube 42 is pressure injected through the minute braid interstices of the wires of the reinforcing layer 44 and through the wires to fill the gaps underneath, throughout and underneath the wires. The melted thermoplastic thermally fuses with the common material on the outside of the inner tube 42 and forms the outer tube or cover 46.

Surprisingly, it has been found that by not supporting or cooling the inner tube 42 with a compressed fluid, and by using the heat present only in the molten thermoplastic (rather than the Chermak and Washkewics use of a separate heating apparatus) to cause heat to radiate through the wires of the reinforcing layer 44, the inner tube 42 does not soften throughout and only liquefies where the molten and pressurized extruded thermoplastic makes contact as the outer tube 46 is formed. This contact permanently and thermally bonds to the outside surface 43 of the inner tube 42 filling the gaps between and underneath the braided wires of the reinforcing layer 44, allowing for a greater surface area of adhesion than Chermak and Washkiewicz. Further, as the inner tube 42 is not significantly heated, the wall of the inner tube 42 remains solidified and by nature cannot protrude through the interstices of the braided wires that comprise the reinforcing layer 44, the known cause of pinhole leaks.

Figure 5:
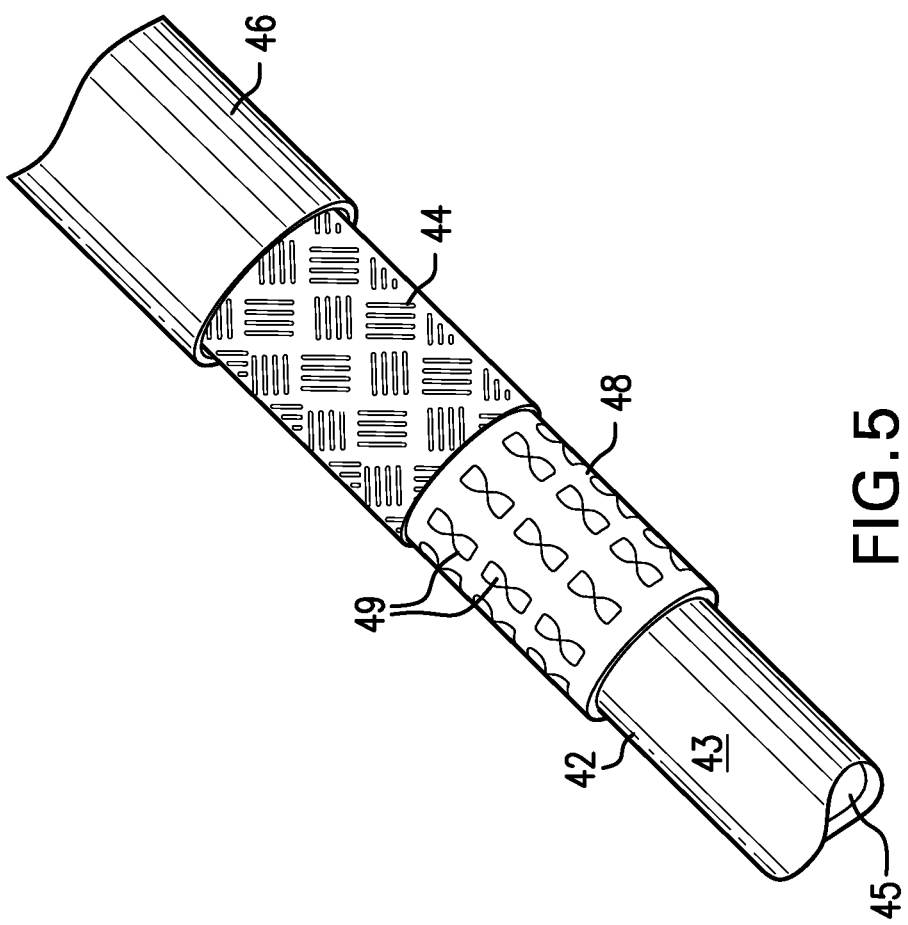
FIG. 5 is a perspective view of another embodiment of a hose constructed according to the principles of the invention with layers partially cut away for purposes of illustration.

Referring now to FIG. 5, there is somewhat graphically illustrated another embodiment of the invention in which there is extruded and bonded to inner tube 42 a second layer 48 of slightly softer co-polyester. The reinforcing layer 44 is then formed by applying the braided structure of wires over the second layer 48. Then, as in the first embodiment, the partially formed hose is passed through an extrusion head where the same or similar melted thermoplastic that forms the inner tube 42 and layer 48 is pressure injected through the minute braid interstices of the wires of the reinforcing layer 44 and through the wires to fill the gaps underneath, throughout and underneath the wires. As in the first embodiment, this produces the desirable protrusions 49 through and underneath the braided wire structure 44 bonding thermally with the larger surface area of the outside of the second layer 48. When the hose is forcibly pulled apart, the remaining protrusions 49 appear as somewhat 'bow tie' shaped in FIG. 5, thus illustrating that the material passes through the interstices between the wires of the reinforcing layer 44 and are permanently bonded to the outside surface 43 of the inner tube 42.

The invention eliminates five of the preceding traditional steps described for the manufacture of wire reinforced rubber hose. Those specific steps eliminated are: Mandrel manufacturing, encapsulating extruded cover, vulcanization, encapsulating layer removal and mandrel blow out. All five steps are extremely laborious and consume large amounts of space, require considerable capital investment, ongoing maintenance and considerable time investment.

Although Chermak has only three basic steps, the present invention is able to run much faster than Chermak because the hose is not tied to the slow speed of the braider. Due to the lack of need for an auxiliary heating process, the expense, complications and maintenance of that process are eliminated.

Washkewics is also a three basic step process, but the method of the present invention is able to run much faster as there is no need to slow the speed of the process to allow time for the transfer of the heat through the wire and substantially through the inner tube in advance of the cover extruder.

Further, because the auxiliary heating process is completely eliminated with the invention, the extremely high cost of electricity is reduced significantly. Thus, further economies of scale are achieved over Chermak and Washkewicz.

Example 1

In the preferred embodiment of the invention illustrated in FIG. 4, a flexible thermoplastic inner tube 42 of co-polyester is extruded in a continuous length onto a drum. The drum of tubing is then paid out into a braiding machine whereby the wire is braided at a pitch of 1.28 to form the braided reinforcing layer 44. The wire reinforced tube is then passed through a T-head extruder where a layer 46 of thermoplastic is applied, the layer 46 being injected through and underneath the braided layer 44, contacting and fusing to the outside surface 43 of the inner tube 42. The hose structure is quenched and for all intents and purpose is a finished hose. This hose is suitable for SAE100R1 and with slight dimensional modifications would be suitable for SAE100R17.

Example 2

In another preferred embodiment of the invention as illustrated in FIG. 5, a flexible thermoplastic tube 42 of co-polyester is extruded, over which tube is extruded and bonded an intermediate layer 48 of slightly softer co-polyester in a continuous length onto a drum. Said drum of tubing is then paid out into a braiding machine whereby steel wire forming the braided reinforcing layer 44 is braided at appropriate diameter, wire count, tensile strength, pitch and tension to impart the desired burst pressure and change in length in accordance with SAE100R1. Said wire reinforced tube is then passed through a T-head extruder where the outer layer 46 of thermoplastic is applied, this layer being injected through, around and underneath the wires of the braided layer 44, contacting and fusing to the outside of layer 48 and forming the protrusions 49. Said hose structure is quenched and for all intents and purpose is a finished hose. This hose is suitable for SAE100R1 and with slight dimensional modifications would be suitable for SAE100R17.

Example 3

Figure 6:
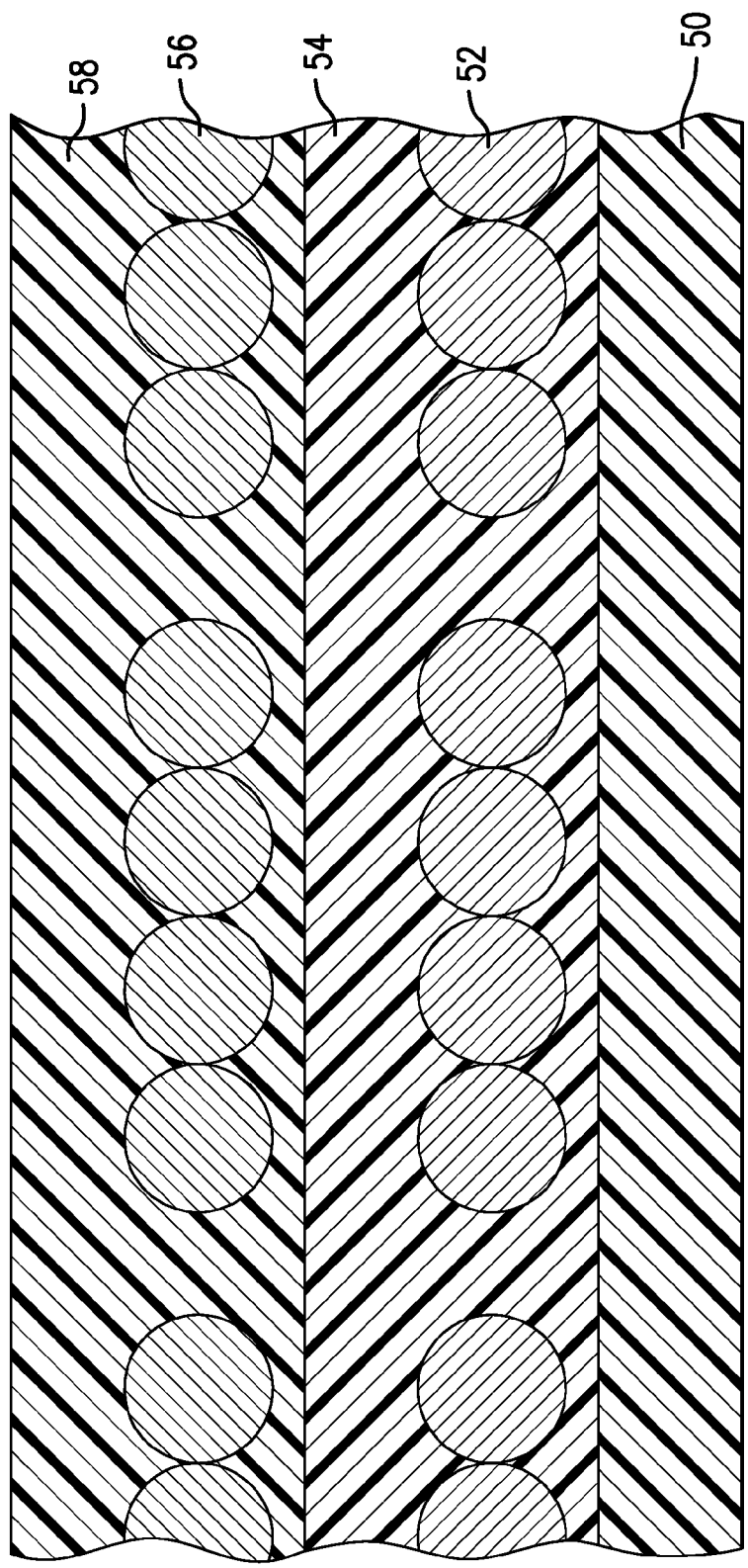
FIG. 6 is a longitudinal sectional view through the walls of another embodiment of a hose constructed according to the principles of the invention

In another preferred embodiment as illustrated in FIG. 6, a flexible thermoplastic inner tube 50 of co-polyester is extruded. Optionally, over tube 50 is extruded and bonded an intermediate layer of slightly softer co-polyester in a continuous length onto a drum, as illustrated in Example 2. Or this intermediate layer can be eliminated. (This intermediate layer 48 is not shown in FIG. 6. It is shown in FIG. 5). The drum of tubing is then paid out into a braiding machine whereby a first layer of steel wire is braided at appropriate diameter, wire count, tensile strength, pitch and tension to form a first braided reinforcing structure 52. The wire reinforced tube is then passed through a T-head extruder where a layer 54 of thermoplastic is applied, said layer 54 being injected through, around and underneath the braided layer 52, contacting and fusing to the outside surface of the inner tube 50 (or the outside surface of the intermediate layer of thermoplastic 48, if used) A second layer of steel wire is then braided at appropriate diameter, wire count, tensile strength, pitch and tension to form a second reinforcing layer 56. The two layers of wire reinforced tube, with an intermediate layer 48, if used, is then passed through a T-head extruder where another layer 58 of thermoplastic is applied to form the outer tube, said layer 58 being injected through, around and underneath the second braided layer 56, contacting and fusing to the outside of the layer 54. Said hose structure is quenched and for all intents and purpose is a finished hose. Said hose is suitable for SAE100R2 and with slight dimensional modifications would be suitable for SAE100R16.

A hose resulting from the present invention will demonstrate the complete elimination of the risk factors associated that causes the pinhole leaks of prior art hoses. Moreover, the hose of the present invention does not use MEK or hazardous solvents of any kind, thus preventing these substances from contaminating the environment. Lastly, the hose of the present invention requires less energy to produce than known prior art hoses and is therefore economically and ecologically more efficient.

The present invention is not limited by the embodiments or examples described herein. The terms and expressions which have been used are used as terms of description and not of limitation and there is no intention in the use of such terms and expressions of excluding any equivalents of any of the features described, or portions thereof, but it is recognized that various modifications are possible within the scope of the invention, which is defined by the following claims.

The invention claimed is:

1. A high pressure hose comprising:
   an inner tube comprised of strong, highly flexible thermoplastic material that defines a fluid carrying passageway, the inner tube having an outer surface and a longitudinal axis;
   a reinforcing layer comprised of a plurality of substantially parallel high tensile strength steel wires helically wound in opposite directions over the outer surface of the inner tube along its longitudinal axis;
   the wires of the reinforcing layer intersecting and forming a braided structure surrounding the outer surface of the inner tube, the reinforcing layer of wires inherently leaving voids between and beneath the braided structure of wires and the inner tube; and
   an outer layer of thermoplastic material extending over the reinforcing layer of wires and extending inwardly to the outer surface of the inner tube below the wires of the reinforcing layer so as to fill the voids in and beneath the braided structure without altering the outer surface of the inner tube, whereby the thermoplastic outer layer permanently fills the voids in and beneath the wires of the reinforcing layer so that the entire surface of the outer layer is fused to the outer surface of the inner tube.

2. The high pressure hose of claim 1 further comprising an intermediate layer of soft thermoplastic material between the outer surface of the inner tube and the reinforcing layer.

3. The high pressure hose of claim 1 that complies with the dynamic performance criteria within SAEJ517:2008, sub-specification SAE100R1.

4. The high pressure hose of claim 1 that complies with the dynamic performance criteria within SAEJ517:2008, sub-specification SAE100R17.

5. The high pressure hose of claim 2 that complies with the dynamic performance criteria within SAEJ517:2008, sub-specification SAE100R1.

6. The high pressure hose of claim 2 that complies with the dynamic performance criteria within SAEJ517:2008, sub-specification SAE100R17.

7. A high pressure hose comprising:
   an inner tube comprised of strong, highly flexible thermoplastic material that defines a fluid carrying passageway, the inner tube having an outer surface and a longitudinal axis;
   a first reinforcing layer comprised of a plurality of substantially parallel high tensile strength steel wires helically wound in opposite directions over the outer surface of the inner tube along its longitudinal axis;
   the wires of the first reinforcing layer intersecting and forming a braided structure surrounding the outer surface of the inner tube, the reinforcing layer of wires inherently leaving voids between and beneath the braided structure of wires;
   a first outer layer of thermoplastic material extending over the first reinforcing layer of wires and extending inwardly to the outer surface of the inner tube below the wires of the first reinforcing layer so as to fill the voids in and beneath the braided structure of the first reinforcing layer without altering the outer surface of the inner tube, whereby the first thermoplastic outer layer permanently fills the voids in the wires of the first reinforcing layer so that the entire surface of the first outer layer is fused to the outer surface of the inner tube;
   a second reinforcing layer comprised of a plurality of substantially parallel high tensile strength steel wires helically wound in opposite directions over the first outer layer of thermoplastic material;

the wires of the second reinforcing layer intersecting and forming a braided structure surrounding the first outer layer of thermoplastic material, said second reinforcing layer of wires inherently leaving voids between the braided structure of wires; and a second outer layer of thermoplastic material extending over the second reinforcing layer of wires and extending inwardly to the first reinforcing layer below the wires of the second reinforcing layer so as to fill the voids in and beneath the braided structure of the second reinforcing layer without altering the second reinforcing layer, whereby the second thermoplastic outer layer permanently fills the voids in the wires of the second reinforcing layer so that the entire surface of the second outer layer is fused to the first outer layer of thermoplastic material.

8. The high pressure hose of claim 7 that complies with the dynamic performance criteria within SAEJ517:2008, sub-specification SAE100R2.

9. The high pressure hose of claim 7 that complies with the dynamic performance criteria within SAEJ517:2008, sub-specification SAE100R16.

10. The high pressure hose of claim 7 further comprising an A intermediate layer of soft thermoplastic material between the outer surface of the inner tube and the first reinforcing layer.

11. The high pressure hose of claim 10 that complies with the dynamic performance criteria within SAEJ517:2008, sub-specification SAE100R2.

12. The high pressure hose of claim 10 that complies with the dynamic performance criteria within SAEJ517:2008, sub-specification SAE100R16.

\* \* \* \* \*